(12) United States Patent
Cheol et al.

(10) Patent No.: US 9,995,868 B2
(45) Date of Patent: Jun. 12, 2018

(54) LIGHT GUIDE PLATE, HAVING QUANTUM DOT LAYER

(71) Applicant: BOE Technology Group Co., Ltd., Beijing (CN)

(72) Inventors: Kim-Hee Cheol, Beijing (CN); Song-Young Suk, Beijing (CN); Yoo-Seong Yeol, Beijing (CN); Choi-Seung Jin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 153 days.

(21) Appl. No.: 14/471,294

(22) Filed: Aug. 28, 2014

(65) Prior Publication Data

US 2015/0378082 A1 Dec. 31, 2015

(30) Foreign Application Priority Data

Jun. 27, 2014 (CN) .......................... 2014 1 0302520

(51) Int. Cl.
  *G02B 6/00* (2006.01)
  *F21V 8/00* (2006.01)
(52) U.S. Cl.
  CPC ......... *G02B 6/0038* (2013.01); *G02B 6/0035* (2013.01)
(58) Field of Classification Search
  CPC ................ G02B 6/0036; G02B 6/0043; G02F 1/133602–1/133606; G02F 1/133609–1/133611; G02F 2001/133607

(Continued)

(56) References Cited

U.S. PATENT DOCUMENTS 5,390,209 A * 2/1995 Vakhshoori ............ B82Y 20/00
  372/27
2013/0336005 A1* 12/2013 Chen .................... G02B 6/0011
  362/611

(Continued)

FOREIGN PATENT DOCUMENTS

CN  103672609 A  3/2014
TW  201312216 A  3/2013

OTHER PUBLICATIONS

First Office Action, including Search Report, for Chinese Patent Application No. 201410302520.8, dated Aug. 12, 2016, 8 pages.

(Continued)

*Primary Examiner* — Sean Gramling
*Assistant Examiner* — Gerald J Sufleta, II
(74) *Attorney, Agent, or Firm* — Westman, Champlin & Koehler, P.A.

(57) ABSTRACT

The present invention discloses a light guide plate, a backlight module and a display device, so as to solve the technical problem of color shift generated in prior art display panel due to the change of angle of view. The light guide plate comprises a bottom surface, a light exiting surface opposite to the bottom surface, and a quantum dot layer provided on the light exiting surface and comprising a quantum dot array, wherein the light exiting surface has a non-planar structure. Embodiments of the present invention provide following advantageous effects: the quantum dots on the surface of the light guide plate are configured to have a non-planar structure, such that the light transmitted through the spacing between quantum dots and having the same spectrum as the quantum dots is smoothly changed, thereby reducing the affection of color shift of the display device due to the change of angle of view.

12 Claims, 5 Drawing Sheets

(58) Field of Classification Search
USPC .................................................. 362/615–629
See application file for complete search history.

(56) References Cited

U.S. PATENT DOCUMENTS

| | | | |
|---|---|---|---|
| 2014/0233212 A1* | 8/2014 | Park | .................. G02F 1/133606 |
| | | | 362/84 |
| 2014/0376261 A1* | 12/2014 | Liu | ...................... G02B 6/0031 |
| | | | 362/609 |
| 2015/0311385 A1 | 10/2015 | Qiu et al. | |
| 2016/0025921 A1 | 1/2016 | Park | |
| 2016/0238774 A1* | 8/2016 | Koike | .................. G02B 6/0043 |

OTHER PUBLICATIONS

Second Office Action for Chinese Patent Application No. 201410302520.8, dated Jan. 3, 2017, 8 pages.
Third Office Action from Chinese Patent Application No. 201410302520.8, dated Jun. 12, 2017, 10 pages.

* cited by examiner

LIGHT GUIDE PLATE, HAVING QUANTUM DOT LAYER

CROSS-REFERENCE TO RELATED APPLICATION

This application claims the benefit of Chinese Patent Application No. 201410302520.8 filed on Jun. 27, 2014 in the State Intellectual Property Office of China, the whole disclosure of which is incorporated herein by reference.

BACKGROUND OF THE INVENTION

Field of the Invention

Embodiments of the present invention relate to a field of display technology, and in particular, to a light guide plate, a backlight module and a display device.

Description of the Related Art

With development and popularization of Light Emitting Diode (LED) light sources, conventional backlight sources such as Cold Cathode Fluorescent Lamp (CCFL) and illumination light sources such as fluorescent lamp or filament lamp have been gradually phased out from the market due to technical problems concerning color performance, environmental protection and power consumption. With the appearance of solid state semiconductor lighting sources, there have been significant changes in backlight and lighting industries, which not only overcomes defects of conventional light sources, but also changes user's habit of using light sources, because a LED light source belongs to one type of semiconductor light sources, and is different from conventional light sources in color characteristic and some of photoelectric characteristics. In view of these different characteristics of the LED light source, some changes should be made to the design of the LED light source, so as to adapt to applications where conventional backlight and illumination light sources have been used.

For example, a desirable LED light source should comprises three characteristics: firstly, good luminous efficiency, that is, a high brightness, and no additional heat dissipation is needed; secondly, good color applicability, that is, the color of the light source does not need to be adjusted for various applications of the illumination or backlight; finally, low cost. Since the cost of a light source accounts for 10% of a total cost of an entire system, an expensive light source will not facilitate its commercialization.

Actually, no perfect light source ever exists, for example, in backlight industry, most of backlight sources for televisions use light sources having a color temperature of 9,000 K and CIE chromaticity coordinates of (X: 0.27; Y: 0.28), while most of backlight sources for monitors use light sources having a color temperature of 6,500 K and CIE chromaticity coordinates of (X: 0.33; Y: 0.32). It is mainly because that color of a light source depends on color filter(s) of a display panel, and the color filter(s) used in the display panels varies from application to application; meanwhile, thicknesses and spacing of the color filters depend on pixels of a product, and change of the color filters relates to the design of the product and manufacturing process of the display panel; furthermore, the cost of a mask is relatively high. In other words, the panel manufacturers will not change the manufacturing processes of the color filters to obtain the characteristics of the backlight sources. Thus, many practitioners are trying to find solutions that can adapt to various color characteristics of the light sources. For example, there is proposed a solution in which a LED light source is used in combination with quantum dots: a layer of quantum dots is located on a light guide plate, so that a backlight source will has a better color tone and achieve a larger color range in CIE chromatic diagram, thereby improving color reproduction ability of a display device using the backlight module as described above.

Figure 1:
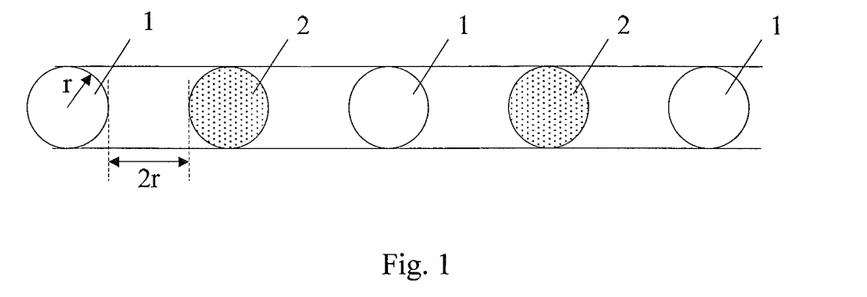
FIG. 1 is a schematic view showing the arrangement of quantum dots in a light guide plate in prior arts.
Figure 2:
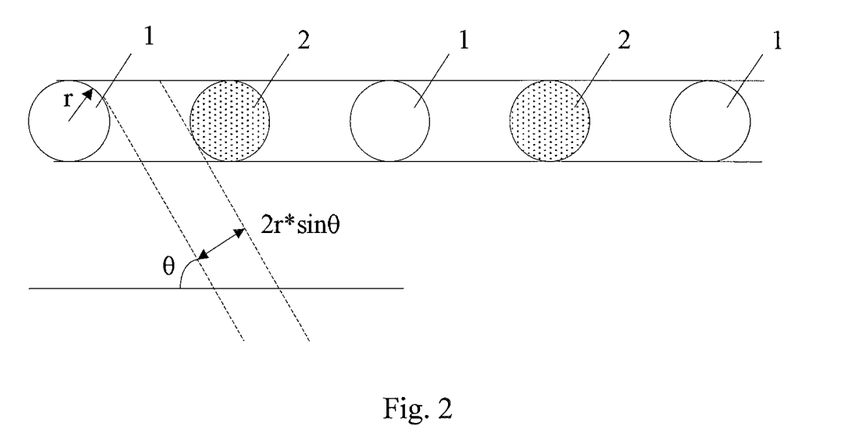
FIG. 2 is a schematic view showing that light is transmitted through the light guide plate shown in FIG. 1 with a light incident angle θ.
Figure 3:
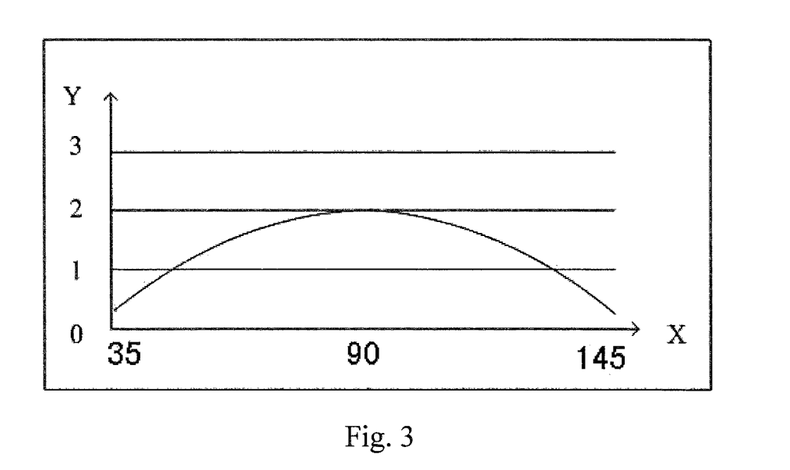
FIG. 3 is a view showing the relationship between an incident angle θ of light incident onto the light guide plate and an effective light transmission spacing between two adjacent quantum dots in prior arts.

The basic operation principle of the light guide plate provided with quantum dots thereon is shown in FIGS. 1-3. FIG. 1 shows a schematic cross sectional view along a row direction or column direction of a quantum dot array on a light guide plate in prior arts. For example, when applied to a blue light source, the quantum dots comprise red light quantum dots 1 and green light quantum dots 2, each of which has a radius of r, and the spacing between adjacent two quantum dots is 2r. When the angle of view is 0 degree (that is, the user directly faces toward to the display device, at this time, the incident angle is 90 degrees), the effective transmission spacing between two adjacent quantum dots is 2r. As shown in FIG. 2, when the incident angle is $\theta$ degrees, the effective transmission spacing between two adjacent quantum dots is $2r*\sin\theta$. Accordingly, a diagram that represents the relationship between the incident angle $\theta$ and the effective light transmission spacing is shown in FIG. 3, where X is the light incident angle $\theta$ (unit: degree), Y is an effective light transmission spacing (unit: r) between two adjacent quantum dots.

In the proposed display device, however, when the angle of view (an included angle between a viewing point and normal of the display panel) is changed, a phenomenon of color shift occurs.

Thus, there is a need for a light guide plate and a display device that are capable of effectively eliminating the phenomenon of color shift.

SUMMARY OF THE INVENTION

In order to solve the problem of color shift of the display panel caused due to change in angle of view in prior arts, the present invention provides a light guide plate, a backlight module and a display device.

In one aspect of the present invention, there is provided a light guide plate.

The light guide plate comprises a bottom surface, a light exiting surface located opposite to the bottom surface, and a quantum dot layer provided on the light exiting surface. The quantum dot layer comprises a quantum dot array, and the light exiting surface has a non-planar structure.

The light guide plate according to the one aspect of the present invention provides following advantageous effects: quantum dots are provided on a surface of the light guide plate having a non-planar structure, so that under different angles of view, light transmitted between quantum dots and having the same spectrum as the quantum dots can be uniformly changed, thereby reducing effect of color shift of the display device caused due to change in angle of view.

In another aspect of the present invention, there is provided a backlight module. The backlight module comprises the light guide plate as described above. The backlight module further comprises a light source provided on the bottom surface side of the light guide plate.

In yet another aspect of the present invention, there is provided a display device. The display device comprises the backlight module as described above.

DETAILED DESCRIPTION OF PREFERRED EMBODIMENTS OF THE INVENTION

Exemplary embodiments of the present invention will be described hereinafter in detail with reference to the attached drawings, wherein the like reference numerals refer to the like elements. The present invention may, however, be embodied in many different forms and should not be construed as being limited to the embodiment set forth herein; rather, these embodiments are provided so that the present invention will be thorough and complete, and will fully convey the concept of the disclosure to those skilled in the art.

In order to solve the technical problem of color shift of the display panel caused due to change in angle of view in prior arts, the present invention provides the following technical solutions.

A light guide plate comprises a bottom surface, a light exiting surface opposite to the bottom surface and having a non-planar structure, and a quantum dot layer provided on the light exiting surface and comprising at least two kinds of quantum dots arranged in a pretertermined pattern.

In embodiments of the present invention, the light exiting surface has a non-planar structure, so that under different angles of view, light transmitted between quantum dots and having the same spectrum as the quantum dots is smoothly changed.

In another embodiment of the present invention, the light exiting surface has a wave-shaped structure or a sawtooth-shaped structure.

In another embodiment of the present invention, the light exiting surface has sawtooth-shaped structure comprising a plurality of sawteeth, each of which has a vertex angle of 80~110 degrees.

In another embodiment of the present invention, the light exiting surface has a wave-shaped structure, a wavy line of the wave-shaped structure is a sine curve with an amplitude between 1.1 and 1.3. In this embodiment of the present invention, the curve of the wavy line is formed by pretermined curvatures, so that under different angles of view, light transmitted between quantum dots and having the same spectrum as the quantum dots is smoothly changed.

In another embodiment of the present invention, a curve between a wave trough and its adjecent wave crest of the wavy lines is divided into 13 sub-curves in accordance with a ratio of 1:1:1:1:2:1:4:1:2:1:1:1:1, and included angles between connection lines for connecting two end points of respective sub-curves respectively and a direction in which the wavy line extends are within the ranges of 0~5 degrees, 5~15 degrees, 15~25 degrees, 25~35 degrees, 35~45 degrees, 45~52 degrees, 52~60 degrees, 45~52 degrees, 35~45 degrees, 25~35 degrees, 15~25 degrees, 5~15 degrees, and 0~5 degrees, respectively.

In another embodiment of the present invention, the quantum dot array comprises two kinds of quantum dots selected from red light quantum dots, green light quantum dot and blue light quantum dots, and all quantum dots are spherical and have the same radii.

It is noted that the quantum dot layer may be a quantum dot film formed, for example, by providing quantum dots in a film forming material; the quantum dot layer may also be formed by providing quantum dots on the light exiting surface directly, that is, no film forming material is needed. In this embodiment, the two kinds of quantum dots are preferably red light quantum dots and green light quantum dots, and the light source is a blue light source. Of course, in other cases, for example, when the light source is changed, the two kinds of quantum dots may comprise combinations of any two kinds quantum dots selected from red light quantum dots, green light quantum dot and blue light quantum dots, or combinations of quantum dots that can emit light of other colors, which will not described here.

When the light exiting surface has a wave-shaped structure or a sawtooth-shaped structure, the quantum dot layer provided on the light exiting surface will consequently has a structure corrponding to that of the light exiting surface, thereby constructing the pattern of the quantum dot layer by changing the structure of the light exiting surface.

In another embodiment of the present invention, the two kinds of quantum dots are alternately arranged to be apart from each other with the same constant spacing in the row direction and the column direction of the quantum dot array. Row and column directions of a light splitting plate may be similarly defined, with the data line direction being defined as the row direction, and the gate line direction being defined as the column direction. The two kinds of quantum dots being arranged to be spaced apart from each other with the same constant spacing in the row and column directions means that the two kinds of quantum dots form a quantum dot array.

In another embodiment of the present invention, the spacing between any two adjacent quantum dots in the row direction and the column direction is equal to a diameter of one quantum dot.

Embodiments of the present invention provide following advantageous effects: the quantum dots on the surface of the light guide plate are configured to have a non-planar structure, such that the light transmitted through the spacing between quantum dots and having the same spectrum as the quantum dots is smoothly changed, thereby reducing the affection of color shift of the display device due to the change of angle of view.

Embodiments of the light guide plate according to the present invention will be described with reference to accomplying figures respectively in order to provide a better understanding the light guide plate provided by the present invention.

First Embodiment

Figure 4:
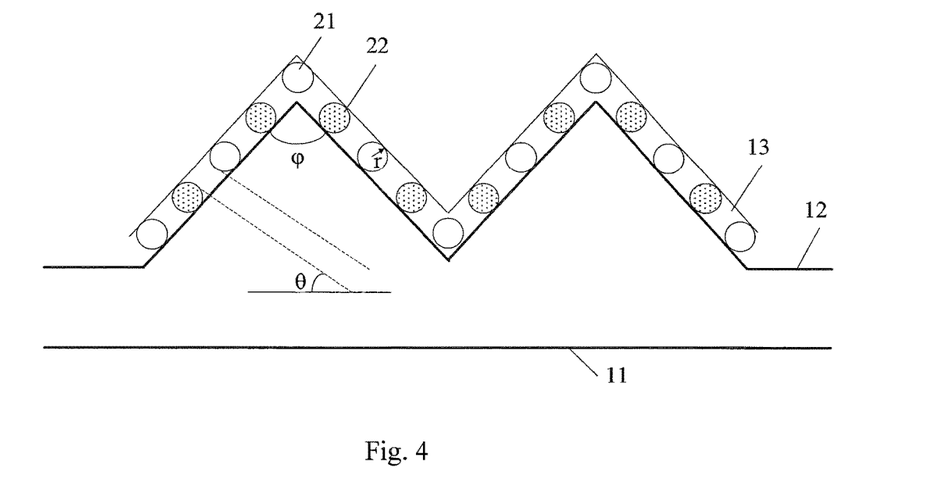
FIG. 4 is a schematic sectional view showing a light guide plate according to a first embodiment of the present invention taken in a row direction or a column direction of a quantum dot matrix, showing a light incident angle θ and a vertex angle φ of a light exiting surface of the light guide plate.

FIG. 4 is a schematic sectional view showing a light guide plate according to a first embodiment of the present invention taken in a row direction or a column direction of a quantum dot matrix. In the first embodiment as shown in FIG. 4, the light guide plate comprises a bottom surface 11 and a light exiting surface 12 located opposite to the bottom surface 11, wherein the light exiting surface 12 has an approximatively sawtooth-shaped structure. In FIG. 4, the sawtooth-shaped structure of the cross section of the light exiting surface 12 comprises a plurality of identical peak portions, each of which is symmetrical with respect to a straight line extending through a vertex of the peak portion and perpendicular to a direction (a horizontal shown in FIG. 4) in which the light guide plate extends.

A quantum dot layer 13 is provided along the light exiting surface 12, and comprises a quantum dot array consisted of, for example, a plurality of red light quantum dots 21 and a plurality of green light quantum dots 22. Row and column directions of the quantum dot array are consistent with those of a light splitting plate (not shown) respectively. Each of the red light quantum dots 21 and green light quantum dots 22 is spherical and has the same radius r. The red light quantum dots 21 and the green light quantum dots 22 are alternately arranged by a constant spacing in the row direction and the column direction of the quantum dot array. Preferably, the spacing is equal to the diameter (2r) of one quantum dot. Thus, the maximum light transmission spacing between adjacent red light quantum dot 21 and green light quantum dot 22 is the same as the diameter of the red light quantum dot 21 or the green light quantum dot 22.

In further preferable examples of the first embodiment, the sawtooth-shaped structure of the light exiting surface 12 comprises a vertex angle (that is, a vertex angle of each peak portion) φ of 80~110 degrees.

Since the quantum dot layer 13 is formed along the light exiting surface 12, the quantum dot layer 13 also has a corresponding sawtooth-shaped structure. As shown in FIG. 4, the quantum dot layer 13 is formed with periodic and continuous folded lines in the row direction or the column direction of the quantum dot array.

Figure 5:
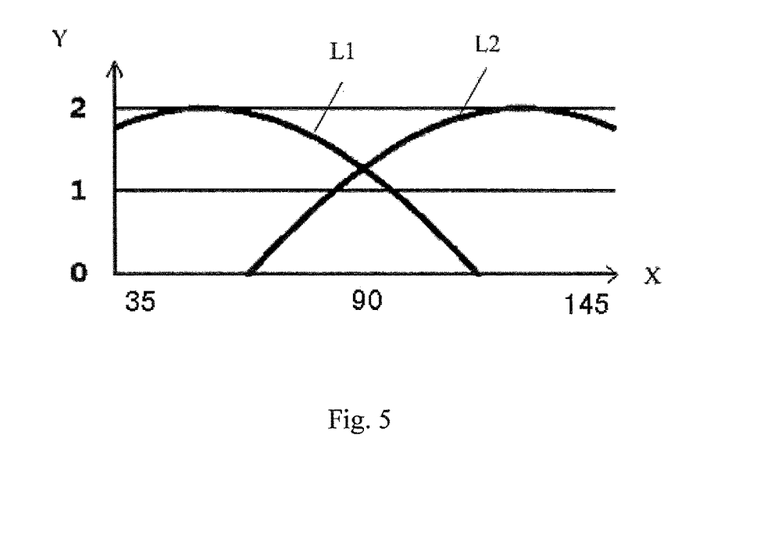
FIG. 5 is a schematic view showing the relationship between the light incident angle θ and the effective light transmission spacing of the light guide plate according to the first embodiment of the present invention when the vertex angle is 110 degrees.

FIG. 5 is a schematic view showing the relationship between the light incident angle θ and the effective light transmission spacing of the light guide plate according to the first embodiment of the present invention when the vertex angle is 110 degrees, where X axis represents the light incident angle θ (unit: degree), and Y axis represents the effective light transmission spacing (unit: r) between two adjacent quantum dots. The effective light transmission spacing is the minimum distance between two adjacent quantum dots in the direction in which the folded lines extend (for example, the horizontal direction as shown in FIG. 4). Since the cross section of the light exiting surface 12 has a periodic and continuous sawtooth-shaped structure, the light exiting surface 12 comprises two visual faces (which correspond to two sides of the sawtooth respectively). When the light incident angle changes, the effective light transmission spacing is changed. As shown in FIG. 5, the effective light transmission spacing between two adjacent red light quantum dot 21 and green light quantum dot 22 on two sides of a sawtooth are indicated by two curves L1 and L2 respectively. It is noted that a vertex angle φ of a sawtooth is the vertex angle of the sawtooth of the sawtooth-shaped structure formed by the quantum dot layer 13, that is, an included angle between two adjacent line segments of the periodic and continuous folded lines in the row direction or the column direction of the quantum dot array of the quantum dot layer 13.

Figure 6:
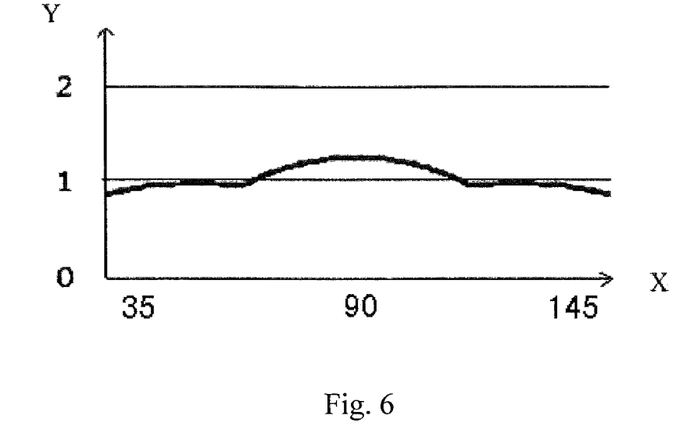
FIG. 6 is a schematic view showing the relationship between the light incident angle θ and the average effective light transmission spacing obtained from FIG. 5.

An average effective light transmission spacing, which is shown in FIG. 6, can be obtained from the two curves of the effective light transmission spacing shown in FIG. 5. In FIG. 6, X axis represents a light incident angle θ (unit: degree), Y axis represents the average effective light transmission spacing (unit: r) between two adjacent quantum dots. Compared to the curves of the effective light transmission spacing shown in FIG. 3, obviously, the average effective light transmission spacing shown in FIG. 6 has a smaller amount of change and is much smoother. That is, under different angles of view, light transmitted through the spacing between quantum dots and having the same spectrum as the quantum dots is smoothly changed, thereby reducing the affection of color shift of the display device due to the change of angle of view.

Figure 7:
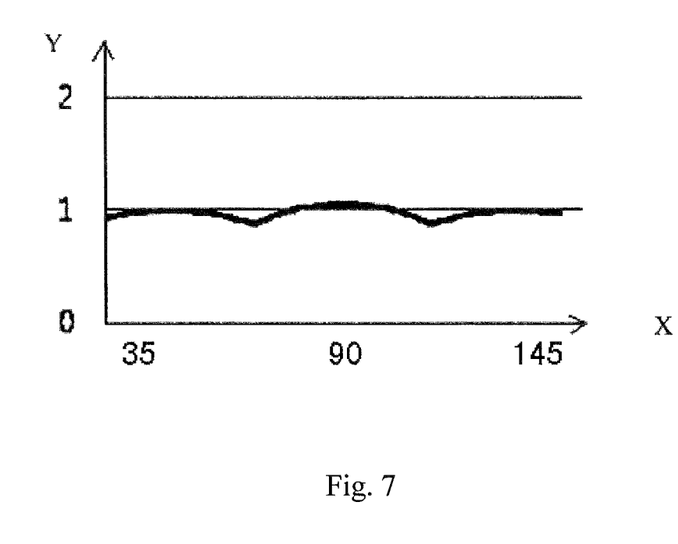
FIG. 7 is a schematic view showing the relationship between the light incident angle θ and the average effective light transmission spacing of the light guide plate according to the first embodiment of the present invention when the vertex angle is 100 degrees.
Figure 8:
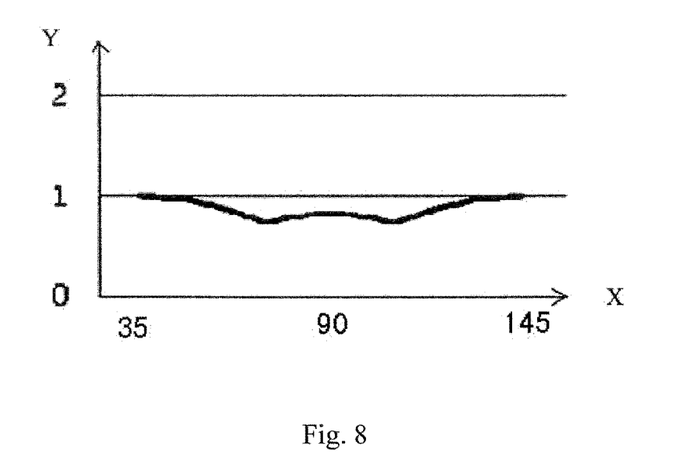
FIG. 8 is a schematic view showing the relationship between the light incident angle θ and the average effective light transmission spacing of the light guide plate according to the first embodiment of the present invention when the vertex angle is 90 degrees.

FIGS. 7 and 8 are schematic views showing the relationships between the light incident angle θ and the average effective light transmission spacing when the vertex angles are 100 degrees and 90 degrees respectively, where X axis represents the light incident angle θ, Y axis represents the average effective light transmission spacing between two adjacent quantum dots.

The above embodiments are illustrative. With the concepts of the present invention, the vertex angle φ may be selected in a range of 80~110 degrees to obtain a desirable light guide plate that can meet the requirements of light guide plates for display devices that have different requirements for lateral angles of view.

Second Embodiment

Figure 9:
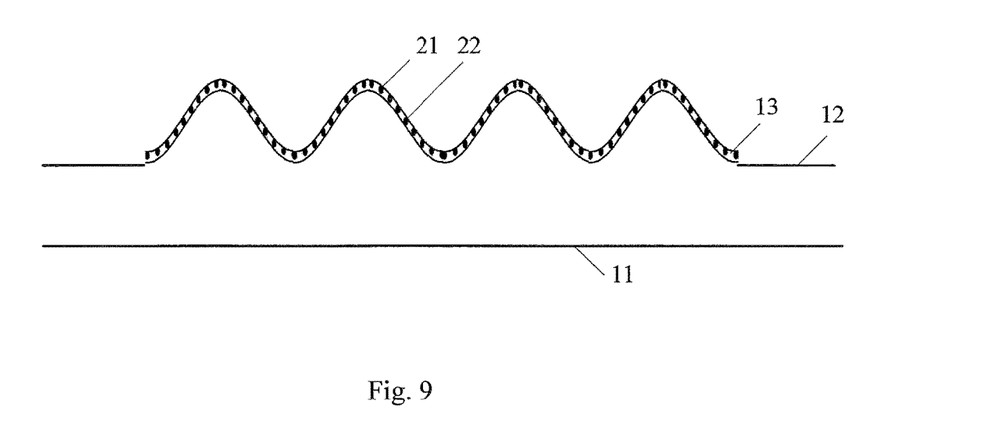
FIG. 9 is a schematic sectional view showing a light guide plate according to a second embodiment of the present invention taken in a row direction or a column direction of a quantum dot matrix.

FIG. 9 is a schematic sectional view showing a light guide plate according to a second embodiment of the present invention taken in a row direction or a column direction of a quantum dot matrix. As shown in FIG. 9, the light guide plate according to the second embodiment of the present invention comprises a bottom surface 11 and a light exiting surface 12 opposite to the bottom surface 11, wherein the light exiting surface 12 has a wave-shaped structure, in which wave peaks and wave troughs are alternately and periodically arranged. In a further preferable embodiment, the wavy line of the wave-shaped structure is a sine curve. In the second embodiment of the present invention, the sine curve satisfies the following sine curve formula:

$$y = A \cdot \sin(180 \cdot x/\pi),$$

where A is a constant between 1.1 and 1.3, and the variable x has units of radians.

A quantum dot layer 13 is provided along the light exiting surface 12, and comprises a quantum dot array consisted of for example, a plurality of red light quantum dots 21 and a plurality of green light quantum dots 22. Row and column directions of the quantum dot array are consistent with those of a light splitting plate (not shown) respectively. Each of the red light quantum dots 21 and green light quantum dots 22 is spherical and has the same radius r. The red light quantum dots 21 and the green light quantum dots 22 are alternately arranged by a constant spacing in the row direction and the column direction of the quantum dot array. Preferably, the spacing is equal to the diameter (2r) of one quantum dot. Thus, in the second embodiment of the present invention, the maximum light transmission spacing between adjacent red light quantum dot 21 and green light quantum dot 22 is the same as the diameter of the red light quantum dot 21 or the green light quantum dot 22.

Figure 10:
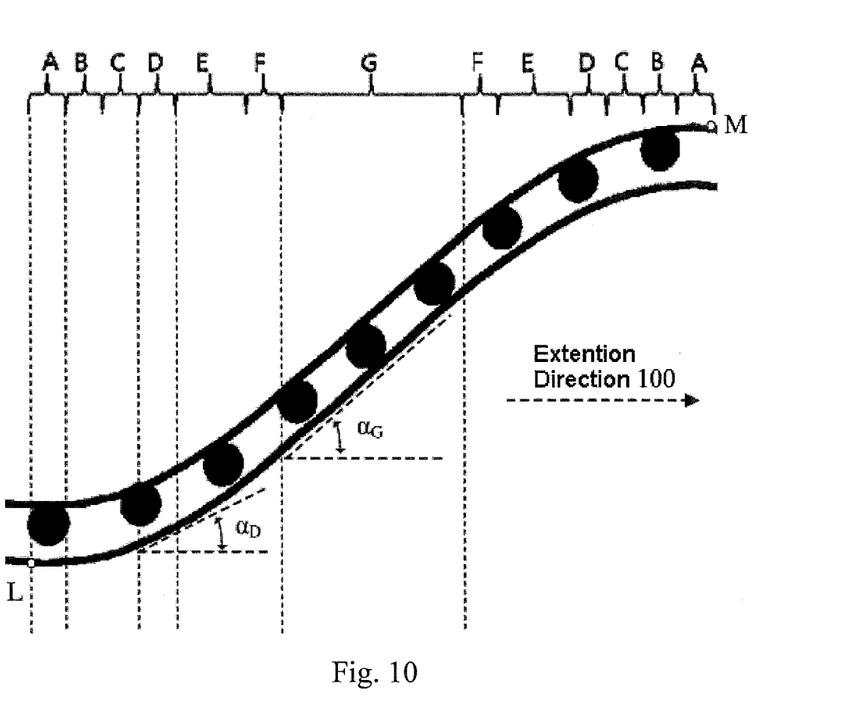
FIG. 10 is a partially enlarged view of the light guide plate show in FIG. 9, showing division of sub-curves, and an included angle between a connection line for connecting two ends of a sub-curve and a direction in which the wavy line extends.

FIG. 10 is a partially enlarged view of the light guide plate shown in FIG. 9, showing one segment of the quantum dot layer 13. The wavy line extends in a direction as indicated by reference number 100 in FIG. 100. In FIG. 10, a curve between a wave trough (such as the L point in FIG. 10) and its adjectent wave crest (such as the M point in FIG. 10) of the wavy line, that is, a curve which is ¼ period of the wavy line, is divided into a plurality of sub-curves in the direction 100 in which the wavy line extends, such as sub-curves A, B, C, D, E, F, G, F, E, D, C, B, and A shown in FIG. 10. An included angle is formed between a connection line for connecting two ends of each sub-curve and a line extends along the direction 100 in which the wavy line extends. For example, the included angle between a connection line (not shown) for connecting two ends of the sub-curve D and the line along the direction 100 in which the wavy line extends is $\alpha_D$; in another example, the included angle between a connection line (not shown) for connecting two ends of the sub-curve G and the line along the direction 100 in which the wavy line extends is $\alpha_G$.

Preferably, the curve from point L to point M, which corresponds to ¼ period of the wavy curve, is divided into 13 sub-curves in accordance with a ratio of 1:1:1:1:2:1:4:1:2:1:1:1:1 from point L to point M, and included angles between connection lines for respectively connecting two end points of each sub-curves and the direction 100 in which the wavy line extends are within the ranges of 0~5 degrees, 5~15 degrees, 15~25 degrees, 25~35 degrees, 35~45 degrees, 45~52 degrees, 52~60 degrees, 45~52 degrees, 35~45 degrees, 25~35 degrees, 15~25 degrees, 5~15 degrees, and 0~5 degrees respectively. It is noted that the division of the sub-curves, the included angles between the connection lines for connecting two end points of respective sub-curves and the direction 100 in which the wavy line extends, are illustrative, and the present invention is not limited thereto.

Figure 11:
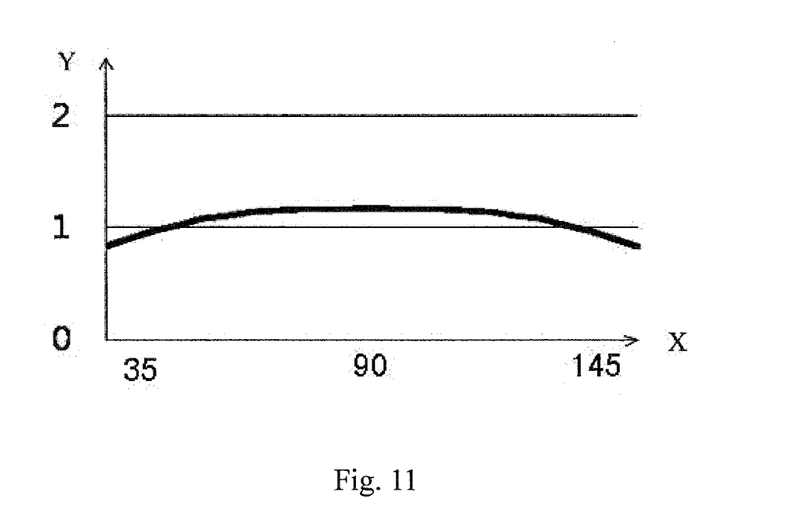
FIG. 11 is a schematic view showing the relationship between the light incident angle θ and the average effective light transmission spacing obtained from FIG. 10.

FIG. 11 is a schematic view showing the relationship between the light incident angle θ and the average effective light transmission spacing, where X axis represents the light incident angle θ, and Y axis represents the average effective light transmission spacing between two adjacent quantum dots. Compared to the curves of the effective light transmission spacing shown in FIG. 3, obviously, the average effective light transmission spacing shown in FIG. 11 has a smaller amount of change and is much smoother. That is, under different angles of view, light transmitted through the spacing between quantum dots and having the same spectrum as the quantum dots is smoothly changed, thereby reducing the affection of color shift of the display device due to the change of angle of view.

This embodiment of the present invention provides following advantageous technical effects: the quantum dots on the surface of the light guide plate are configured to have a non-planar structure, such that the light transmitted through the spacing between quantum dots and having the same spectrum as the quantum dots is smoothly changed, thereby reducing the affection of color shift of the display device due to the change of angle of view.

The present invention further relates to a backlight module, which comprises the light guide plate as described in the above embodiments, and a light source provided on the bottom surface side of the light guide plate. For example, the quantum dot layer of the light guide plate may comprises red light quantum dots and green light quantum dots therein, and the light source can emit blue light.

This embodiment of the present invention provides following advantageous technical effects: the quantum dots on the surface of the light guide plate are configured to have a non-planar structure, such that the light transmitted through the spacing between quantum dots and having the same spectrum as the quantum dots is smoothly changed, thereby reducing the affection of color shift of the display device due to the change of angle of view.

The present invention further relates to a display device comprising the black module as described above.

This embodiment of the present invention provide following advantageous technical effects: the quantum dots on the surface of the light guide plate are configured to have a non-planar structure, such that the light transmitted through the spacing between quantum dots and having the same spectrum as the quantum dots is smoothly changed, thereby reducing the affection of color shift of the display device due to the change of angle of view.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A light guide plate, comprising:
a substrate having a bottom surface and a light exiting surface opposite to the bottom surface; and
a quantum dot layer formed on the light exiting surface of the substrate and comprising a quantum dot array,
wherein the light exiting surface has a non-planar structure;
wherein the quantum dot array consists of a plurality of quantum dots arranged directly on the light exiting surface of the substrate without the use of a film forming material;
wherein a cross section of the light exiting surface in a row direction or a column direction of the quantum dot array has a wave-shaped structure, and a wavy line of the wave-shaped structure is a sine curve which satisfies y=A·sin(180·x/π), where A is a constant between 1.1 and 1.3, and the variable x has units of radians; and
wherein a curve between a wave trough and its adjacent wave crest of the wavy line is divided into 13 sub-curves in accordance with a ratio of 1:1:1:1:2:1:4:1:2:1:1:1:1, and included angles between connection lines for connecting two end points of respective sub-curves and the direction in which the wavy line extends are within the ranges of 0~5 degrees, 5~15 degrees, 15~25 degrees, 25~35 degrees, 35~45 degrees, 45~52 degrees, 52~60 degrees, 45~52 degrees, 35~45 degrees, 25~35 degrees, 15~25 degrees, 5~15 degrees, and 0~5 degrees, respectively.

2. The light guide plate according to claim 1, wherein the plurality of quantum dots comprise two kinds of quantum dots selected from red light quantum dots, green light quantum dot and blue light quantum dots, and each of the plurality of quantum dots is spherical and has the same radii.

3. The light guide plate according to claim 2, wherein the two kinds of quantum dots are alternately arranged with a constant spacing in the row direction and the column direction of the quantum dot array.

4. The light guide plate according to claim 3, wherein the spacing equals to a diameter of one quantum dot.

5. A backlight module, comprising:
a light guide plate; and
a light source provided on the bottom surface side of the light guide plate,
wherein the light guide plate comprises:
  a substrate having a bottom surface and a light exiting surface opposite to the bottom surface; and
  a quantum dot layer formed on the light exiting surface of the substrate and comprising a quantum dot array,
wherein the light exiting surface has a non-planar structure;
wherein the quantum dot array consists of a plurality of quantum dots arranged directly on the light exiting surface of the substrate without the use of a film forming material;
wherein a cross section of the light exiting a surface in a row direction or a column direction of the quantum dot array has a wave-shaped structure, and a wavy line of the wave-shaped structure is a sine curve which satisfies $y=A \cdot \sin(180 \cdot x/\pi)$, where A is a constant between 1.1 and 1.3 , and the variable x has units of radians; and
wherein a curve between a wave trough and its adjacent wave crest of the wavy line is divided into 13 sub-curves in accordance with a ratio of 1:1:1:1:2:1:4:1:2:1:1:1:1, and included angles between connection lines for connection two end points of respective sub-curves and the direction in which the wavy line extends are within the ranges of 0~5 degrees, 5~15 degrees, 15~25 degrees, 25~35 degrees, 35~45 degrees, 45~52 degrees, 52~60 degrees, 45~52 degrees, 35~45 degrees, 25~35 degrees, 15~25 degrees, 5~15 degrees, and 0~5 degrees, respectively.

6. The backlight module according to claim 5, wherein the plurality of quantum dots comprise two kinds of quantum dots selected from red light quantum dots, green light quantum dot and blue light quantum dots, and each of the plurality of quantum dots is spherical and has the same radii.

7. The backlight module according to claim 6, wherein the two kinds of quantum dots are alternately arranged with a constant spacing in the row direction and the column direction of the quantum dot array.

8. The backlight module according to claim 7, wherein the spacing equals to a diameter of one quantum dot.

9. A display device, comprising a backlight module comprising a light guide plate and a light source provided on the bottom surface side of the light guide plate,
wherein the light guide plate comprises:
  a substrate having a bottom surface and a light exiting surface opposite to the bottom surface; and
  a quantum dot layer formed on the light exiting surface of the substrate and comprising a quantum dot array,
wherein the light exiting surface has a non-planar structure;
wherein the quantum dot array consists of a plurality of quantum dots arranged directly on the light exiting surface of the substrate without the use of a film forming materials;
wherein a cross section of the light exiting surface in a row direction or a column direction of the quantum dot array has a wave-shaped structure, and a wavy line of the wave-shaped structure is a sine curve which satisfies $y=A \cdot \sin(180 \cdot x/\pi)$, where A is a constant between 1.1 and 1.3 , and the variable x has units of radians; and
wherein a curve between a wave trough and its adjacent wave crest of the wavy line is divided into 13 sub-curves in accordance with a ratio of 1:1:1:1:2:1:4:1:2:1:1:1:1, and included angles between connection lines for connection two end points of respective sub-curves and the direction in which the way line extends are within the ranges of 0~5 degrees, 5~15 degrees, 15~25 degrees, 25~35 degrees, 35~45 degrees, 45~52 degrees, 52~60 degrees, 45~52 degrees, 35~45 degrees, 25~35 degrees, 15~25 degrees, 5~15 degrees, and 0~5 degrees, respectively.

10. The backlight module according to claim 9, wherein the plurality of quantum dots comprise two kinds of quantum dots selected from red light quantum dots, green light quantum dot and blue light quantum dots, and each of the plurality of quantum dots is spherical and has the same radii.

11. The backlight module according to claim 10, wherein the two kinds of quantum dots are alternately arranged with a constant spacing in the row direction and the column direction of the quantum dot array.

12. The backlight module according to claim 11, wherein the spacing equals to a diameter of one quantum dot.

* * * * *